(12) United States Patent
Yoon et al.

(10) Patent No.: US 10,698,243 B2
(45) Date of Patent: Jun. 30, 2020

(54) DISPLAY APPARATUS

(71) Applicant: LG Display Co., Ltd., Seoul (KR)

(72) Inventors: SeungHwan Yoon, Seoul (KR); KiDuk Kim, Paju-si (KR); DongKyun Lim, Goyang-si (KR); JaiHyuk Lee, Gwangju-si (KR)

(73) Assignee: LG Display Co., Ltd., Seoul (KR)

( * ) Notice: Subject to any disclaimer, the term of this patent is extended or adjusted under 35 U.S.C. 154(b) by 31 days.

(21) Appl. No.: 16/107,021

(22) Filed: Aug. 21, 2018

(65) Prior Publication Data

US 2019/0155087 A1    May 23, 2019

(30) Foreign Application Priority Data

Nov. 20, 2017 (KR) .................. 10-2017-0154631

(51) Int. Cl.
| | | |
|---|---|---|
| *G02F 1/1333* | (2006.01) | |
| *G02F 1/13357* | (2006.01) | |
| *H04R 1/22* | (2006.01) | |
| *H04R 7/04* | (2006.01) | |
| *H04R 1/02* | (2006.01) | |
| *H04R 1/26* | (2006.01) | |
| *H04R 7/10* | (2006.01) | |
| *H04R 7/08* | (2006.01) | |

(52) U.S. Cl.
CPC .. *G02F 1/133308* (2013.01); *G02F 1/133602* (2013.01); *H04R 1/22* (2013.01); *H04R 7/045* (2013.01); *G02F 2001/133314* (2013.01); *H04R 1/025* (2013.01); *H04R 1/26* (2013.01); *H04R 7/08* (2013.01); *H04R 7/10* (2013.01); *H04R 2440/05* (2013.01); *H04R 2499/15* (2013.01)

(58) Field of Classification Search
CPC ................................. G02F 1/133308
See application file for complete search history.

(56) References Cited

U.S. PATENT DOCUMENTS

| | | | | |
|---|---|---|---|---|
| 3,618,072 A | * | 11/1971 | Kirkpatrick | G09F 9/307 340/326 |
| 2005/0051892 A1 | * | 3/2005 | Andoh | H01J 9/261 257/724 |
| 2014/0049522 A1 | * | 2/2014 | Mathew | H05B 33/0896 345/204 |
| 2014/0334078 A1 | * | 11/2014 | Lee | H04M 1/03 361/679.01 |
| 2015/0124191 A1 | * | 5/2015 | Yu | G02F 1/133308 349/58 |
| 2015/0131827 A1 | * | 5/2015 | Hawker | H04R 25/00 381/312 |

(Continued)

FOREIGN PATENT DOCUMENTS

KR  101704517  *  2/2017  .......... G02F 1/1333

*Primary Examiner* — Sang V Nguyen
(74) *Attorney, Agent, or Firm* — Morgan, Lewis & Bockius LLP

(57) ABSTRACT

A display apparatus includes a display module displaying an image, a rear structure supporting the display module, a vibration generating device vibrating the display module, and a stiff member disposed on a rear surface of the display module. Accordingly, a sound pressure level corresponding to a high frequency domain is prevented from being reduced, thereby enhancing the quality of a sound output to a region in front of a display panel.

17 Claims, 11 Drawing Sheets

(56) References Cited

U.S. PATENT DOCUMENTS

| | | | |
|---|---|---|---|
| 2016/0026030 A1* | 1/2016 | Kang | G02F 1/133308 |
| | | | 349/58 |
| 2016/0212516 A1* | 7/2016 | Park | H04R 1/028 |
| 2016/0293440 A1* | 10/2016 | Nagatomo | H01L 21/308 |
| 2017/0153487 A1* | 6/2017 | Kim | G02B 6/0055 |
| 2018/0035208 A1* | 2/2018 | Choi | G06F 3/167 |

* cited by examiner

DISPLAY APPARATUS

CROSS-REFERENCE TO RELATED APPLICATIONS

This application claims the benefit of the Korean Patent Application No. 10-2017-0154631 filed on Nov. 20, 2017, which is hereby incorporated by reference as if fully set forth herein.

BACKGROUND

Technical Field

The present disclosure relates to a display apparatus.

Discussion of the Related Art

Recently, as society advances to the information-oriented society, the field of display apparatuses for visually displaying an electrical information signal has rapidly advanced. Consequently, various display apparatuses having excellent performances such as thinness, lightness, and low power consumption are being developed. Examples of the display apparatuses may include liquid crystal display (LCD) apparatuses, field emission display (FED) apparatuses, organic light emitting display apparatuses, etc.

Generally, display apparatuses display an image on a display panel, but a separate speaker should be installed for providing a sound. In a case where a speaker is installed in a display apparatus, a traveling direction of a sound output through the speaker is a direction toward a side end or an upper/lower end of the display panel, instead of a front surface or a rear surface of the display panel, and thus, the sound does not travel in a direction toward a viewer who is watching an image in front of the display panel, whereby an immersiveness of the viewer watching the image is hindered.

Moreover, in a case where a speaker included in a set device such as televisions (TVs) is provided, the speaker occupies a certain space, and due to this, the design and space disposition of the set device are limited. In order to solve such a problem, conventional display apparatuses may vibrate a display panel to output a sound to a region in front of the display panel. However, a vibration transfer ability of the display panel is reduced in a high frequency domain, causing the reduction in clearness of a sound.

Moreover, since a vibration transfer ability of a display panel is reduced, a sound pressure level is reduced, and in this case, by increasing an applied voltage so as to compensate for the loss of the sound pressure level, power consumption increases. In order to solve such a problem, it is required to develop display apparatuses which enable a vibration transfer ability of a display panel to be enhanced in the high frequency domain.

SUMMARY

Therefore, the inventors have recognized the above-described problems and have made various experiments so that when watching an image in front of a display panel, a traveling direction of a sound becomes a direction toward a front surface of the display panel, and thus, sound quality is enhanced. Through the various experiments, the inventors have implemented a display apparatus having a new structure, which outputs a sound having a traveling direction that is a direction toward a front surface of a display panel, thereby enhancing sound quality.

Accordingly, embodiments of the present disclosure are directed to a display apparatus that substantially obviates one or more problems due to limitations and disadvantages of the related art.

An aspect of the present disclosure is to provide a display apparatus in which a stiff member is disposed on a rear surface of a display module acting as a vibration plate to complement a stiffness of the display module, thereby improving an electromagnetic force performance of a vibration generating device.

Another aspect of the present disclosure is to provide a display apparatus in which a stiff member is disposed in a rear edge of a display module to minimize an increase in mass of the display module acting as a vibration plate and complement a stiffness of the display module, thereby improving an electromagnetic force performance of a vibration generating device to enhance a vibration transfer characteristic of the display apparatus.

Another aspect of the present disclosure is to provide a display apparatus in which a stiffness of a display module is complemented by using a stiff member, and thus, an electromagnetic force performance of a vibration generating device is improved, thereby preventing a reduction in a sound pressure level corresponding to a high frequency domain to enhance the quality of a sound output to a region in front of the display module.

Another aspect of the present disclosure is to provide a display apparatus that includes a stiff member arranged in a long side direction of a display module, and thus, prevents a sound pressure level corresponding to a high frequency domain from being reduced, thereby enhancing flatness of a sound pressure level corresponding to a whole frequency domain and enhancing clarity of a sound.

Another aspect of the present disclosure is to provide a display apparatus that prevents a sound pressure level corresponding to a high frequency domain from being reduced, thereby minimizing the loss of consumption power.

The objects of the present disclosure are not limited to the aforesaid, but other objects not described herein will be clearly understood by those skilled in the art from descriptions below.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display apparatus comprises a display module displaying an image, a rear structure supporting the display module, a vibration generating device vibrating the display module, and a stiff member disposed on a rear surface of the display module.

Details of other embodiments are included in the detailed description and the drawings.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles of the disclosure. In the drawings.

DETAILED DESCRIPTION

Figure 1:
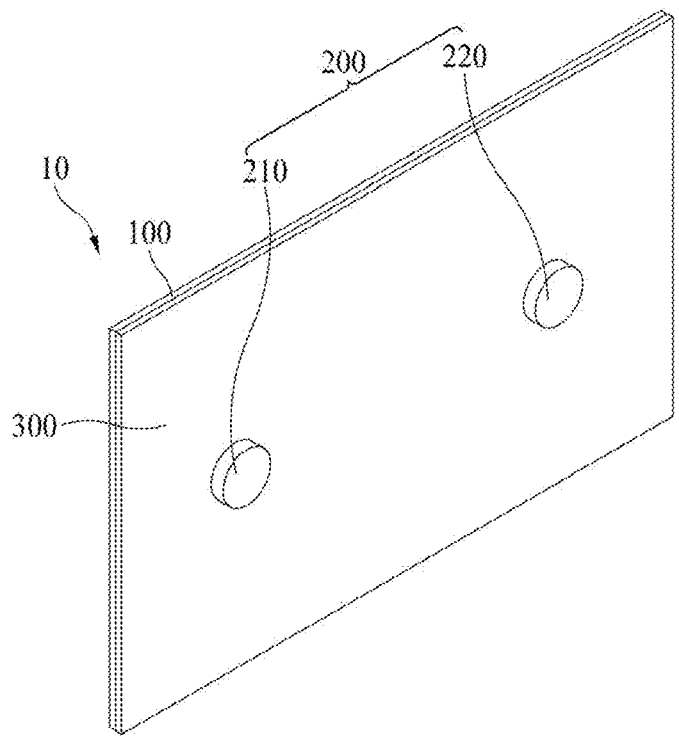
FIG. 1 is a perspective view of a display apparatus according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first", "second", etc. may be used. The terms are merely for differentiating one element from another element, and the essence, sequence, order, or number of a corresponding element should not be limited by the terms. It will be understood that when an element or layer is described as being "connected", "coupled", or "adhered" to another element or layer, the element or layer can be directly connected or adhered to the other element or layer, but the other element or layer can be "disposed" between elements or layers, or elements or layers can be "connected", "coupled", or "adhered" to each other through the other element or layer.

In the present disclosure, examples of a display apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic device such as a notebook computer, a TV, a computer monitor, an equipment apparatus including an automotive apparatus or another type apparatuses for vehicles, or a mobile electronic device such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set device which is a final consumer device or an application product including the LCM or the OLED module.

Depending on the case, an LCM or an OLED module including a display panel and a driver may be referred to as a narrow-sense display apparatus, and an electronic device which is a final product including an LCM or an OLED module may be referred to as a set device. For example, the narrow-sense display apparatus may include a display panel, such as an LCD or an OLED, and a source printed circuit board (PCB) which is a controller for driving the display panel. The set device may further include a set PCB which is a set controller electrically connected to the source PCB to overall control the set device.

A display panel applied to the present embodiment may use all types of display panels such as a liquid crystal display panel, an organic light emitting diode (OLED) display panel, and an electroluminescent display panel, but is not limited to a specific display panel which is vibrated by a sound generating device according to the present embodiment to output a sound. Also, a shape or a size of a display panel applied to a display apparatus according to the present embodiment is not limited.

For example, if the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

Moreover, if the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like).

Moreover, the display panel may further include a backing such as a metal plate attached on the display panel. However, the present embodiment is not limited to the metal plate, and the display panel may include another structure.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings.

Figure 2:
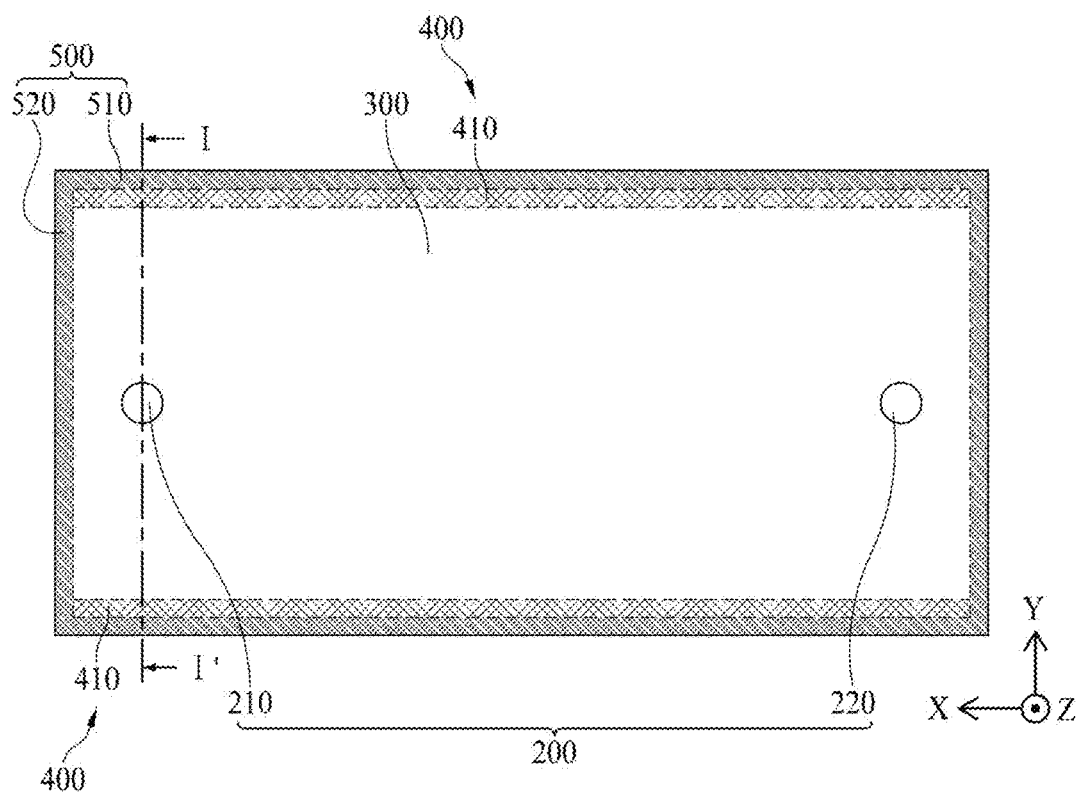
FIG. 2 is a rear view of a display apparatus according to a first embodiment of the present disclosure.
Figure 3A:
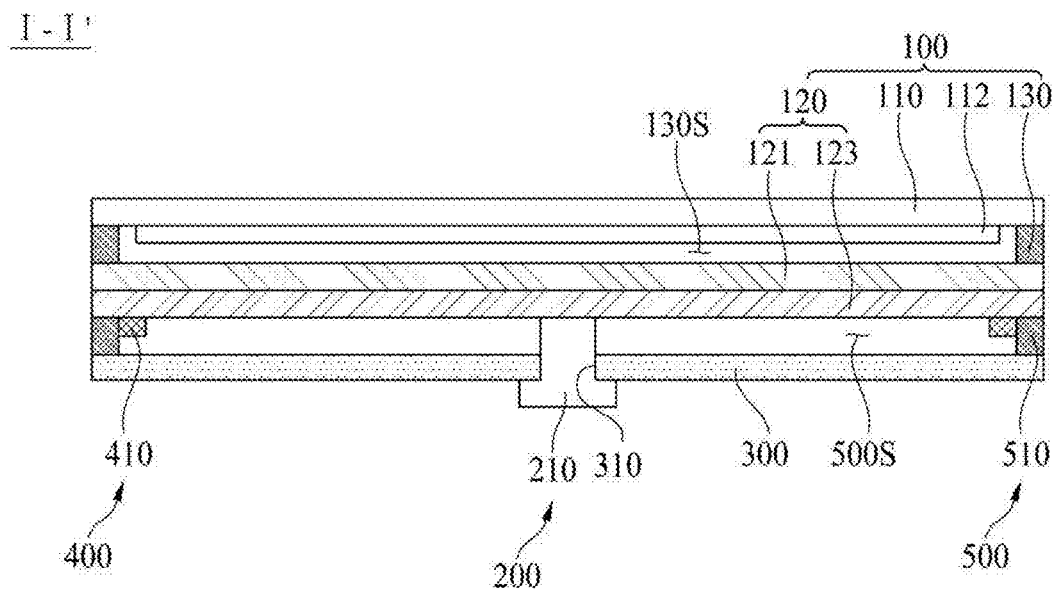
FIGS. 3A and 3B are cross-sectional views taken along line I-I' of FIG. 2.
Figure 3B:
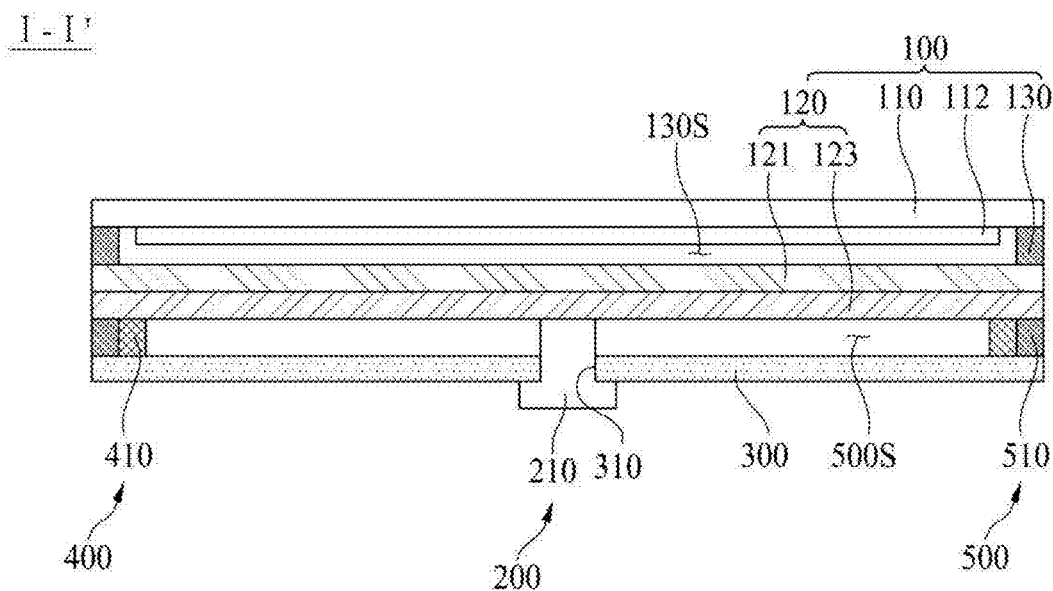
Figure 4:
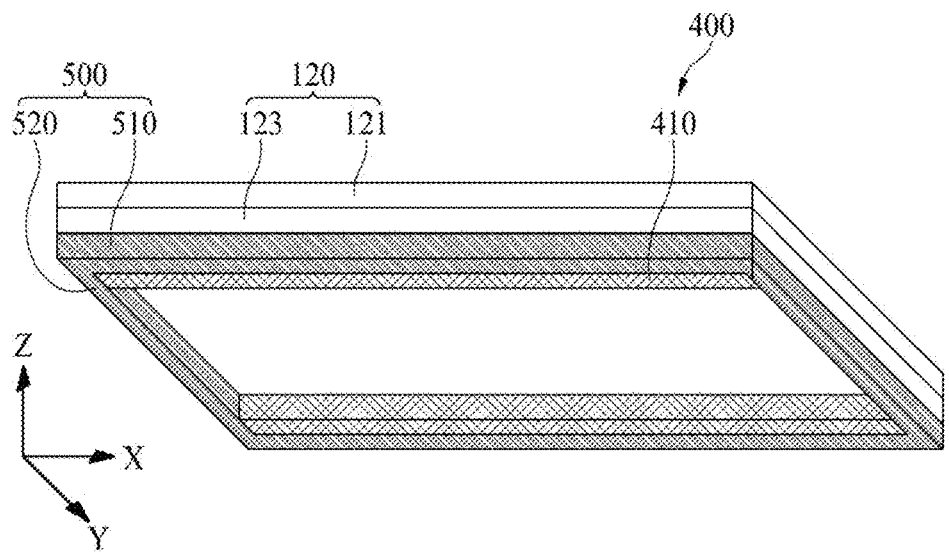
FIG. 4 is a perspective view illustrating a configuration of a stiff member in the display apparatus of FIG. 2.

FIG. 1 is a perspective view of a display apparatus according to an embodiment of the present disclosure, and FIG. 2 is a rear view of a display apparatus according 10 to a first embodiment of the present disclosure. FIGS. 3A and 3B are cross-sectional views taken along line I-I' of FIG. 2, and FIG. 4 is a perspective view illustrating a configuration of a stiff member in the display apparatus 10 of FIG. 2.

Referring to FIGS. 1 to 4, the display apparatus 10 may include a display module 100, a vibration generating device 200, a rear structure 300, a stiff member 400, and an adhesive member 500.

The display module 100 may include a display panel 110 and a backlight unit 120.

The display panel 110 may display an image and may be implemented as all types of display panels such as a liquid crystal display panel, an organic light emitting diode (OLED) display panel, an electroluminescent display panel, etc.

The display panel 110 may include a front surface, which displays an image, and a rear surface onto which light is irradiated from the backlight unit 120. According to an embodiment, the display panel 110 may be a liquid crystal display panel and may display an image by using the light irradiated from the backlight unit 120.

The display module 100 may further include an optical sheet part 112 disposed on the rear surface of the display panel 110. The optical sheet part 112 may be attached on the rear surface of the display panel 110 and may be spaced apart from the front surface of the backlight unit 120. The optical sheet part 112 may be disposed on the rear surface of the display panel 110 to enhance a luminance characteristic of light emitted from the backlight unit 120. According to an embodiment, the optical sheet part 112 may be a complex optical sheet which has a function of diffusing light incident thereon and a function of collecting the diffused light.

The backlight unit 120 may be disposed on and spaced apart from the rear surface of the display panel 110 with respect to a thickness direction of the display panel 110 and may irradiate the light onto the rear surface of the display panel 110. Also, the backlight unit 120 may be disposed on and spaced apart from a front surface of the rear structure 300 with respect to the thickness direction of the display panel 110. For example, a front surface of the backlight unit 120 may face the rear surface of the display panel 110, and a rear surface of the backlight unit 120 may face the front surface of the rear structure 300.

According to an embodiment, the backlight unit 120 may receive a vibration of the vibration generating device 200 and may transfer the vibration to the display panel 110. For example, the vibration generating device 200 may vibrate in contact with a portion of the rear surface of the backlight unit 120 to vibrate a whole surface of the backlight unit 120. The vibration of the backlight unit 120 may be transferred to the display panel 110 through a module adhesive member 130 and a gap space 130S between the display panel 110 and the backlight unit 120.

The backlight unit 120 may include a light guide plate 121 and a reflective sheet 123.

The light guide plate 121 may be disposed on a front surface of the reflective sheet 124 to configure the front surface of the backlight unit 120. In detail, the light guide plate 121 may include a light incident surface and may be disposed on and spaced apart from the rear surface of the display panel 110. The light guide plate 121 may change a traveling direction of light, which is incident through the light incident surface, to a direction toward the display panel 110. According to an embodiment, the light guide plate 121 may include a light-transmitting plastic, a glass material, and/or the like. For example, the light guide plate 121 may include sapphire glass, but may be implemented with glass for guiding light without being limited thereto.

The reflective sheet 123 may configure the rear surface of the backlight unit 120 and may be connected to the vibration generating device 200. In detail, the reflective sheet 123 may support the light guide plate 121 disposed on a front surface thereof and may reflect light incident from the light guide plate 121. Therefore, the reflective sheet 123 prevents the light incident from the light guide plate 121 from being transferred to a region behind the backlight unit 120 and maintains a uniformity of light transferred to a region in front of the backlight unit 120.

The display module 100 may further include the module adhesive member 130. In detail, the module adhesive member 130 may be disposed between a front edge of the backlight unit 120 and a rear edge of the display panel 110. The module adhesive member 130 may be coupled to each of the backlight unit 120 and the display panel 110 and may allow the display panel 110 to be spaced apart from the backlight unit 120. For example, the module adhesive member 130 may provide the gap space 130S between the rear surface of the display panel 110 and the front surface of the backlight unit 120. The backlight unit 120 may receive a vibration transferred from the vibration generating device 200, and the display panel 110 may receive the vibration from the backlight unit 120 by using a sound pressure of the gap space 130S. Also, the gap space 130S provided between the display panel 110 and the backlight unit 120 prevents the light of the backlight unit 120 from non-uniformly concentrating on a specific position, thereby enhancing a light luminance uniformity of the display apparatus 10.

According to an embodiment, the module adhesive member 130 may have a sealing structure having a four-side-sealed type or a closed loop type. The module adhesive member 130 may surround the gap space 130S provided between the display panel 110 and the backlight unit 120 and may allow a sound pressure generated from the backlight unit 120 to be transferred to the display panel 110. The module adhesive member 130 may directly transfer a vibration of the backlight unit 120 to the display panel 110.

For example, the module adhesive member 130 may include an acryl-based material or a urethane-based material. Here, the module adhesive member 130 may include the acryl-based material which has a relatively better adhesive force and relatively higher hardness than the urethane-based material, in order for the vibration of the backlight unit 120 to be transferred to the display panel 110. In this case, the module adhesive member 130 may include a foam pad including the acryl-based material and an adhesive layer provided on each of a front surface and a rear surface of the foam pad.

As another example, the urethane-based material has a light leakage prevention characteristic which is relatively better than the acryl-based material, and thus, considering prevention of light leakage, the module adhesive member 130 may include the urethane-based material.

The vibration generating device 200 may be disposed on a rear surface of the display module 100 to vibrate the display module 100. In detail, the vibration generating device 200 may be fixed to the rear structure 300 and may vibrate the display panel 110 through the backlight unit 120 to output a sound to a region in front of the display panel 110. For example, the vibration generating device 200 may generate the sound by using the display panel 110, vibrating along with the vibration of the backlight unit 120, as a vibration plate.

The vibration generating device 200 may pass through the rear structure 300 and may contact the rear surface of the backlight unit 120, and thus, may directly vibrate the backlight unit 120. According to an embodiment, an upper portion of the vibration generating device 200 may be inserted into a through hole 310 provided in the rear structure 300 and may be connected to the rear surface of the backlight unit 120, and a lower portion of the vibration generating device 200 may contact and may be fixed to the rear surface of the rear structure 300. Therefore, by using the rear structure 300 as a supporter, the vibration generating device 200 may vibrate according to a vibration signal corresponding to a sound signal associated with an image to vibrate the backlight unit 120, and the display panel 110 may receive the vibration of the backlight unit 120 to output a sound to a region in front of the display panel 110. Therefore, by using the display panel 110 vibrated based on the vibration of the backlight unit 120 as a vibration plate of a sound device, the display apparatus 10 may output a sound to a region in front of the display panel 110 instead of a region behind and under the display panel 110, and thus, may match a position of an image displayed by the display apparatus 10 with a position of a sound generated by the display apparatus 10, thereby enhancing an immersiveness of a viewer who is watching the image displayed by the display apparatus 10.

According to an embodiment, the vibration generating device 200 may include first and second sound generating modules 210 and 220 which vibrate different regions of the display panel 110. In detail, the first and second sound generating modules 210 and 220 may be fixed through the rear structure 300 and may be spaced apart from each other. For example, the display panel 110 may include a left region and a right region, the first sound generating module 210 may overlap the left region of the display panel 110, and the second sound generating module 220 may overlap the right region of the display panel 110. Therefore, the first sound generating device 210 may be disposed on a left side of the rear surface of the backlight unit 120 to vibrate the left region of the display panel 110, and the second sound generating device 220 may be disposed on a right side of the rear surface of the backlight unit 120 to vibrate the right region of the display panel 110. The first and second sound generating modules 210 and 220 may receive different vibration signals and may be independently driven. For example, the first sound generating module 210 may generate a sound by using, as a vibration plate, the left region of the display panel 110 vibrated based on the vibration of the backlight unit 120, and the second sound generating module 220 may generate a sound by using the right region of the display panel 110 as a vibration plate.

According to an embodiment, the vibration generating device 200 may be disposed in a region adjacent to an edge of the display module 100. In detail, a vibration having a low frequency domain generated by the sound generating module 210 may be rectilinearly transferred through the backlight unit 120, the gap space 130S between the display panel 110 and the backlight unit 120, and the display panel 110, and thus, a sound having the low frequency domain may be output to a region in front of the display panel 110. Also, a vibration having a high frequency domain generated by the vibration generating device 200 may be sequentially transferred to an edge of the backlight unit 120, the module adhesive member 130, and the display panel 110, and thus, a sound having the high frequency domain may be output to the region in front of the display panel 110. Therefore, the vibration having the low frequency domain may be preferentially transferred to the gap space 130S between the display panel 110 and the backlight unit 120, but the vibration having the high frequency domain may be preferentially transferred to the module adhesive member 130 through the edge of the backlight unit 120. In this manner, if the sound generating module 210 is spaced apart from the edge of the display module 100 by a long distance, a vibration transmission path corresponding to the high frequency domain may extend, and thus, a sound pressure level corresponding to the high frequency domain is reduced. Therefore, the sound generating module 210 may be disposed in a region adjacent to the edge of the display module 100, and thus, a length of a vibration transmission path corresponding to the high frequency domain may be minimized, thereby preventing a sound pressure level corresponding to the high frequency domain from being reduced. As a result, if the vibration generating device 200 is disposed in the region adjacent to the edge of the display module 100, the display apparatus 10 may output a sound where a sound pressure level corresponding to the high frequency domain is high, in comparison with a case where the vibration generating device 200 is spaced apart from the edge of the display module 100 by a long distance.

According to an embodiment, the vibration generating device 200 may be disposed to ensure a degree of freedom in design of the display apparatus 10 without any reduction in stiffness of the rear structure 300 and to minimize a length of the vibration transmission path corresponding to the high frequency domain. In detail, the vibration generating device 200 may be inserted into the through hole 310 of the rear structure 300, and a position of the through hole 310 may be set so as not to decrease the stiffness of the rear structure 300. In this case, if the through hole 310 of the rear structure 300 is very adjacent to the adhesive member 500, the stiffness of the rear structure 300 is reduced, and for this reason, the through hole 310 may not fully overlap the edge of the display module 100. Also, if the through hole 310 is disposed in the edge of the display module 100 so as to be exposed at one side of the display apparatus 10, a degree of freedom in design of the display apparatus 10 is reduced. Therefore, the through hole 310 may be disposed adjacent to the edge of the display module 100 within a range which enables the stiffness of the rear structure 300 not to be reduced. Also, the vibration generating device 200 may be disposed so as not to be exposed at one side of the display apparatus 10, thereby enhancing a degree of freedom in design of the display apparatus 10. As a result, the vibration generating device 200 may be disposed based on a position of the through hole 310 so as to ensure a degree of freedom in design of the display apparatus 10 without any reduction in stiffness of the rear structure 300 and to minimize the length of the vibration transmission path corresponding to the high frequency domain.

According to an embodiment, the vibration generating device 200 may be a speaker, and for example, may be a sound actuator, a sound exciter, or a piezoelectric element, but is not limited thereto. In other embodiments, the vibration generating device 200 may be a sound device for outputting a sound according an electrical signal.

The rear structure 300 may surround the rear surface 120b of the backlight unit 120. In detail, the rear structure 300 may cover the whole rear surface of the backlight unit 120 so as to be spaced apart from the whole rear surface and may have a plate shape formed of a glass, a metal material, or a plastic material. Here, an edge or a sharp corner of the rear structure 300 may have a tetragonal shape or a curved shape through a chamfer process or a corner rounding process. According to an embodiment, the rear structure 300 including the glass material may include sapphire glass. For example, the rear structure 300 including the metal material may be formed of one of aluminum (Al), an Al alloy, a magnesium (Mg) alloy, and an iron (Fe)-nickel (Ni) alloy. As another example, the rear structure 300 may have a stacked structure including a glass plate, which has a thickness relatively thinner than a metal plate and a glass plate and faces the rear surface of the backlight unit 120, and in this case, a rear surface of the display apparatus 10 may be used as a mirror surface due to the metal plate.

The rear structure 300 may include the through hole 310 into which the vibration generating device 200 is inserted. In detail, in order for the vibration generating device 200 to be inserted into the through hole 310, a boring part having a circular shape or a polygonal shape may be provided in a partial region of the rear structure 300 along a thickness direction of the rear structure 300. According to an embodiment, the through hole 310 cannot fully overlap the edge of the display module 100 so as to maintain a stiffness of the rear structure 300 and a reliability of the display apparatus 10, but the vibration generating device 200 may be disposed adjacent to the edge of the display module 100 within a range which enables a stiffness of the rear structure 300 to be maintained.

The stiff member 400 may be disposed on the rear surface of the display module 100 and may overlap at least one edge of the display module 100. According to an embodiment, the stiffness member 400 may include a first stiff member 410 disposed in a pair of edges of the display module 100. In detail, the display module 100 may include a pair of first edges parallel to a first direction X and a pair of second edges parallel to a second direction Y intersecting the first direction X. Here, the pair of first edges of the display module 100 may correspond to an edge parallel to a long side of the display module 100, and the pair of second edges may correspond to an edge parallel to a short side of the display module 100. However, the present embodiment is not limited thereto. Also, the first stiff member 410 may be disposed in parallel with the pair of first edges of the display module 100. For example, the first stiff member 410 may be disposed on the rear surface of the backlight unit 120 along a long side lengthwise direction X of the backlight unit 120. Here, since the first stiff member 410 is disposed along the long side lengthwise direction X of the backlight unit 120, the stiffness of the display module 100 is complemented, thereby improving an electromagnetic force performance of the vibration generating device 200.

According to an embodiment, the stiff member 400 may be disposed in parallel with the adhesive member 500. In detail, the display module 100 may include a pair of first edges parallel to the first direction X and a pair of second edges parallel to the second direction Y intersecting the first direction X. Here, the pair of first edges of the display module 100 may correspond to a long side edge of the display module 100, and the pair of second edges may correspond to a short side edge of the display module 100. However, the present embodiment is not limited thereto. Also, the adhesive member 500 may include a first adhesive member 510 disposed in the pair of first edges of the display module 100 and a second adhesive member 520 disposed in the pair of second edges of the display module 100. Therefore, the first stiff member 410 may be disposed on the rear surface of the backlight unit 120 in parallel with the first adhesive member 510. For example, both ends of the first stiff member 410 may contact the second adhesive member 520 disposed in the pair of second edges. As another example, the both ends of the first stiff member 410 may be spaced apart from the second adhesive member 520 disposed in the pair of second edges. Also, the first stiff member 410 may contact an inner surface of the first adhesive member 510, but is not limited thereto. As a result, the first stiff member 410 and the first adhesive member 510 may be disposed in parallel along the long side lengthwise direction X of the backlight unit 120, and thus, the stiffness of the display module 100 is more complemented than a weight increase rate of the display module 100, thereby improving the electromagnetic force performance of the vibration generating device 200.

According to an embodiment, the stiff member 400 may be disposed on a rear edge of the display module 100, and thus, enhances an electromagnetic force (for example, Lorentz force) of the vibration generating device 200, thereby preventing a sound pressure level corresponding to the high frequency domain from being reduced. Here, a resonant frequency "$f_0$" of a vibration generated by the vibration generating device 200 may be determined as expressed in the following equation:

$$f_0 = \frac{1}{2\pi}\sqrt{\frac{k}{m}}$$

where k denotes a stiffness of an object, m denotes a mass of the object. For example, the vibration generating device 200 may increase the stiffness "k" of the object or may decrease the mass "k" according to the equation, thereby enhancing a vibration characteristic corresponding to the high frequency domain. As another example, the vibration generating device 200 may increase the mass "m" of the object, and simultaneously, may more increase the stiffness "k" of the object than an increase rate of the mass "m", thereby enhancing the vibration characteristic corresponding to the high frequency domain. Accordingly, in the display apparatus 10, since the stiff member 400 is disposed on the rear edge of the display module 100, an increase in the mass "m" of the display module 100 acting as a vibration plate is minimized, and the stiffness "k" of the display module 100 is complemented. As a result, the display apparatus 10 enhances the electromagnetic force of the vibration generating device 200 acting on the display module 100, and thus, prevents a sound pressure level corresponding to the high frequency domain from being reduced, thereby enhancing flatness of a sound pressure level corresponding to a whole frequency domain and enhancing clarity of a sound.

In FIG. 3A, the stiff member 400 may be spaced apart from the front surface of the rear structure 300. In detail, the stiff member 400 and the adhesive member 500 may be disposed in parallel on the rear surface of the display module 100, but a thickness of the stiff member 400 may differ from that of the adhesive member 500. For example, the thickness of the stiff member 400 may be set thinner than that of the adhesive member 500, and thus, a rea surface of the stiff member 400 may be spaced apart from the front surface of the rear structure 300. Here, the stiff member 400 and the adhesive member 500 may be formed of different materials, and the stiff member 400 may include a material having a vibration transfer characteristic higher than that of the adhesive member 500. Accordingly, the stiff member 400 may be spaced apart from the rear structure 300, thereby preventing a vibration of the display module 100 from being transferred to the rear structure 300.

In FIG. 3B, the stiff member 400 may contact the front surface of the rear structure 300. In detail, the stiff member 400 and the adhesive member 500 may be disposed in parallel on the rear surface of the display module 100, and the thickness of the stiff member 400 may be the same as that of the adhesive member 500. For example, the thickness of the stiff member 400 may be set equal to that of the adhesive member 500, and thus, the rea surface of the stiff member 400 may contact the front surface of the rear structure 300. Here, the stiff member 400 may include a material which is higher in stiffness than the adhesive member 500. Accordingly, a vibration displacement of an edge of the display module 100 may be reduced by the stiff member 400 fixed between the display module 100 and the rear structure 300. As a result, in the display apparatus 10, since the stiff member 400 having the same thickness as that of the adhesive member 500 is provided, the vibration displacement of the display module 100 is reduced in comparison with a case where only the adhesive member 500 is provided in the edge of the display module 100, thereby enhancing a vibration transfer characteristic of the display panel 110 corresponding to the high frequency domain.

According to an embodiment, the stiff member 400 may include a material having high stiffness, and thus, enhances the vibration transfer characteristic of the display module 100 acting as a vibration plate. For example, the stiff member 400 may include metal such as Al, copper (Cu), or stainless steel having an excellent vibration transfer characteristic, or may include a tempered plastic compound. Therefore, the stiff member 400 may more increase stiffness than a weight increase rate of the display module 100, thereby enhancing the electromagnetic force of the vibration generating device 200 acting on the display module 100 and preventing a sound pressure level, output to the region in front of the display panel 110, from being reduced. Also, the stiff member 400 may be implemented to have an excellent vibration transfer characteristic corresponding to the high frequency domain, thereby enhancing flatness of a sound pressure level corresponding to a whole frequency domain.

According to an embodiment, the stiff member 400 may include a material which is higher in stiffness than the adhesive member 500. For example, the adhesive member 500 may include an optically clear resin (OCR), an optically clear adhesive (OCA) film, or a foam pad including an acryl-based material. The stiff member 400 may include metal such as Al, copper (Cu), or stainless steel having an excellent vibration transfer characteristic, or may include a tempered plastic compound. Accordingly, the stiff member 400 complements the stiffness of the display module 100, and the adhesive member 500 may attach the display module 100 on the rear structure 300 and may prevent light from being leaked.

The adhesive member 500 may be disposed between the edge of the display module 100 and an edge of the rear structure 300 and may attach the display module 100 on the rear structure 300. In detail, the adhesive member 500 may be disposed between the backlight unit 120 and the rear structure 300 to have a certain thickness (or height) and may have a sealing structure having a four-side-sealed type or a closed loop type. The adhesive member 500 may be provided between a rear edge of the backlight unit 120 and a front edge of the rear structure 300 and may couple the rear structure 300 to the rear surface of the backlight unit 120, thereby a gap space 500S between the rear surface of the backlight unit 120 and the front surface of the rear structure 300. Here, the gap space 500S may be used as a space, where the stiff member 400 is disposed, and a space which enables a vibration of each of the rear structure 300 and the backlight unit 120 based on driving of the vibration generating device 200. Also, the gap space 500S provided between the backlight unit 120 and the rear structure 300 prevents the light of the backlight unit 120 from non-uniformly concentrating on a specific position, thereby enhancing the light luminance uniformity of the display apparatus 10.

According to an embodiment, the adhesive member 500 may include a foam pad including an acryl-based material and an adhesive layer provided on each of a front surface and a rear surface of the foam pad.

According to an embodiment, the adhesive member 500 may include an OCR, an OCA film, a double-sided tape, and/or the like.

Figure 5:
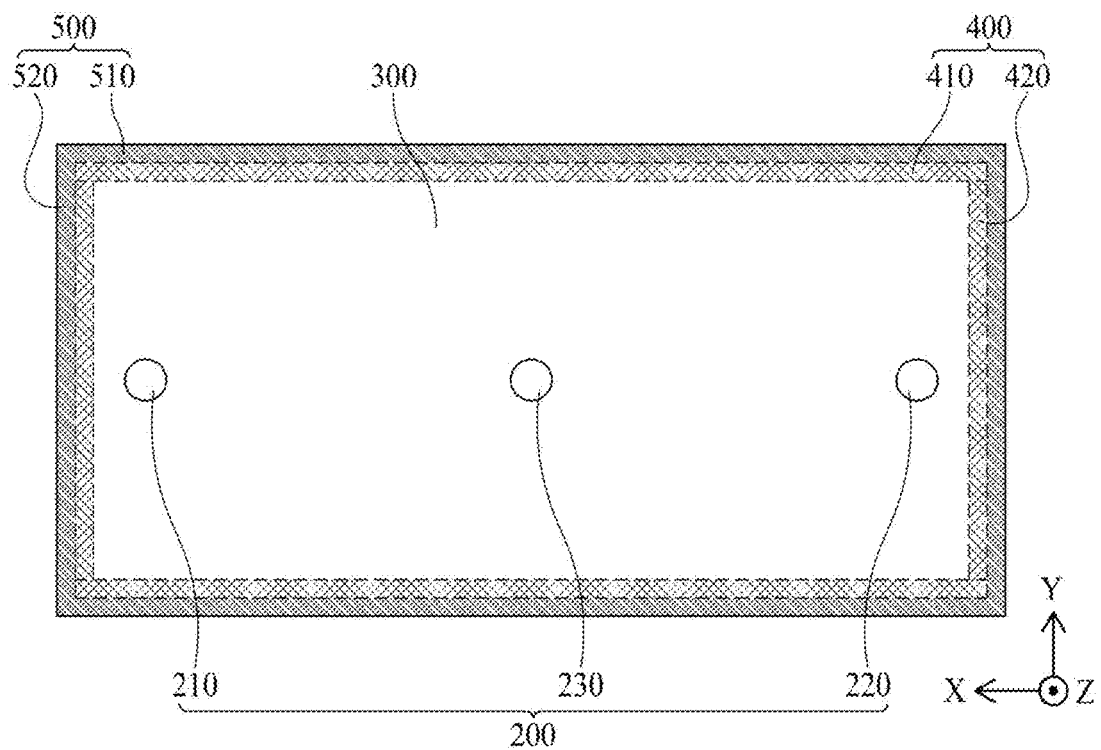
FIG. 5 is a rear view of a display apparatus according to a second embodiment of the present disclosure.
Figure 6:
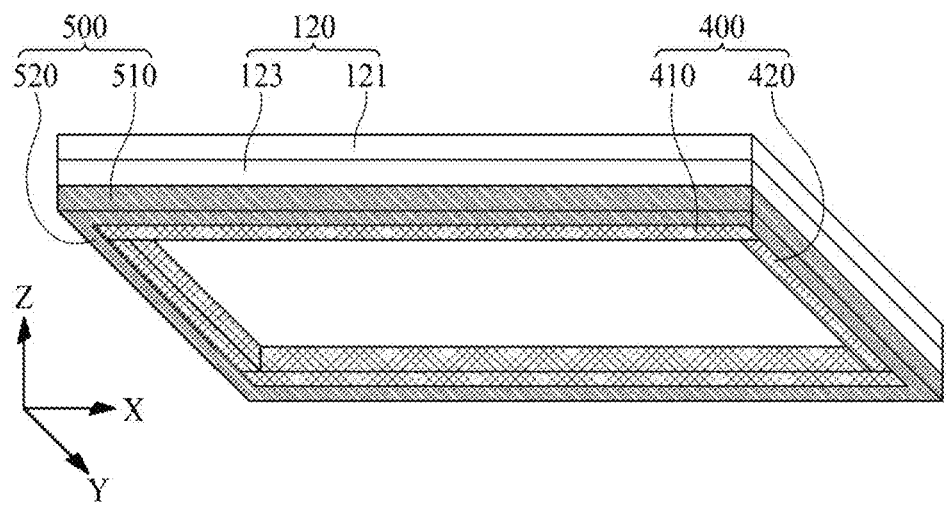
FIG. 6 is a perspective view illustrating a configuration of a stiff member in the display apparatus of FIG. 5.

FIG. 5 is a rear view of a display apparatus according to a second embodiment of the present disclosure, and FIG. 6 is a perspective view illustrating a configuration of a stiff member in the display apparatus of FIG. 5.

Referring to FIGS. 5 and 6, the display panel 110 may include a left region, a right region, and a middle region, and the vibration generating device 200 may include first to third sound generating modules 210 to 230 for vibrating different regions of the display panel 110. According to an embodiment, the first sound generating module 210 may overlap the left region of the display module 100, the second sound generating module 220 may overlap the right region of the display module 100, and the third sound generating module 230 may overlap the middle region of the display module 100.

According to an embodiment, each of the first and second sound generating modules 210 and 220 may transfer a vibration having the high frequency domain to both side edges of the display module 100, and the third sound generating module 230 may transfer a vibration having the low frequency domain to the middle region of the display module 100. For example, a vibration having the high frequency domain generated by each of the first and second sound generating modules 210 and 220 may be sequentially transferred to an edge of the backlight unit 120, the module adhesive member 130, and the display panel 110, and thus, a sound having the high frequency domain may be output to a region in front of the display panel 110. Also, a vibration having the low frequency domain generated by the third sound generating module 230 may be sequentially transferred to the backlight unit 120, the gap space 130S between the display panel 110 and the backlight unit 120, and the display panel 110, and thus, a sound having the low frequency domain may be output to the region in front of the display panel 110. Therefore, the vibration generating device 200 may transfer the vibration having the high frequency domain, generated by each of the first and second sound generating modules 210 and 220, to the edge of the display module 100 and may transfer the vibration having the low frequency domain, generated by the third sound generating module 230, to the middle region of the display module 100, thereby preventing a sound pressure level corresponding to each of the high frequency domain and the low high frequency from being reduced and enhancing flatness of a sound pressure level corresponding to a whole frequency domain to enhance clarity of a sound.

A stiff member 400 may include a first stiff member 410 and a second stiff member 420. In detail, the display module 100 may include a pair of first edges parallel to a first direction X and a pair of second edges parallel to a second direction Y intersecting the first direction X. Here, the pair of first edges of the display module 100 may correspond to an edge parallel to a long side of the display module 100, and the pair of second edges may correspond to an edge parallel to a short side of the display module 100. However, the present embodiment is not limited thereto. Also, the first stiff member 410 may be disposed in parallel with the pair of first edges of the display module 100, and the second stiff member 420 may be disposed in parallel with the pair of second edges of the display module 100. For example, the first stiff member 410 may be disposed on the rear surface of the backlight unit 120 along the long side lengthwise direction X of the backlight unit 120, and the second stiff member 420 may be disposed on the rear surface of the backlight unit 120 along a short side lengthwise direction Y of the backlight unit 120. Therefore, since each of the first and second stiff members 410 and 420 is disposed along the long side lengthwise direction X or the short side lengthwise direction Y of the backlight unit 120, the stiffness of the display module 100 is complemented, thereby improving the electromagnetic force performance of the vibration generating device 200.

According to an embodiment, the stiff member 400 may be disposed in parallel with the adhesive member 500. In detail, the stiff member 400 may include the first stiff member 410 and the second stiff member 420. The first stiff member 410 may be disposed in parallel with a pair of first edges of the display module 100, and the second stiff member 420 may be disposed in parallel with a pair of second edges of the display module 100. Here, the pair of first edges of the display module 100 may correspond to the long side edge of the display module 100, and the pair of second edges may correspond to the short side edge of the display module 100. However, the present embodiment is not limited thereto. Also, the adhesive member 500 may include a first adhesive member 510 disposed in the pair of first edges of the display module 100 and a second adhesive member 520 disposed in the pair of second edges of the display module 100. Therefore, the first stiff member 410 may be disposed on the rear surface of the backlight unit 120 in parallel with the first adhesive member 510. Therefore, the first stiff member 410 may be disposed on the rear surface of the display module 100 in parallel with the first adhesive member 510, and the second stiff member 420 may be disposed on the rear surface of the display module 100 in parallel with the second adhesive member 520. For example, both ends of the first stiff member 410 may contact the second adhesive member 520 disposed in the pair of second edges, and both ends of the second stiff member 420 may contact the first adhesive member 510 disposed in the pair of first edges. As another example, the both ends of the first stiff member 410 may be spaced apart from the second adhesive member 520 disposed in the pair of second edges, and the both ends of the second stiff member 420 may be spaced apart from the first adhesive member 510 disposed in the pair of first edges. Also, the first stiff member 410 may contact an inner surface of the first adhesive member 510, and the second stiff member 420 may contact an inner surface of the second adhesive member 520. However, the present embodiment is not limited thereto. As a result, the first stiff member 410 and the first adhesive member 510 may be disposed in parallel along the long side lengthwise direction X of the backlight unit 120, and the second stiff member 420 and the second adhesive member 520 may be disposed in parallel along the short side lengthwise direction Y of the backlight unit 120, thereby more complementing the stiffness of the display module 100 than a weight increase rate of the display module 100 to improve the electromagnetic force performance of the vibration generating device 200.

Figure 7:
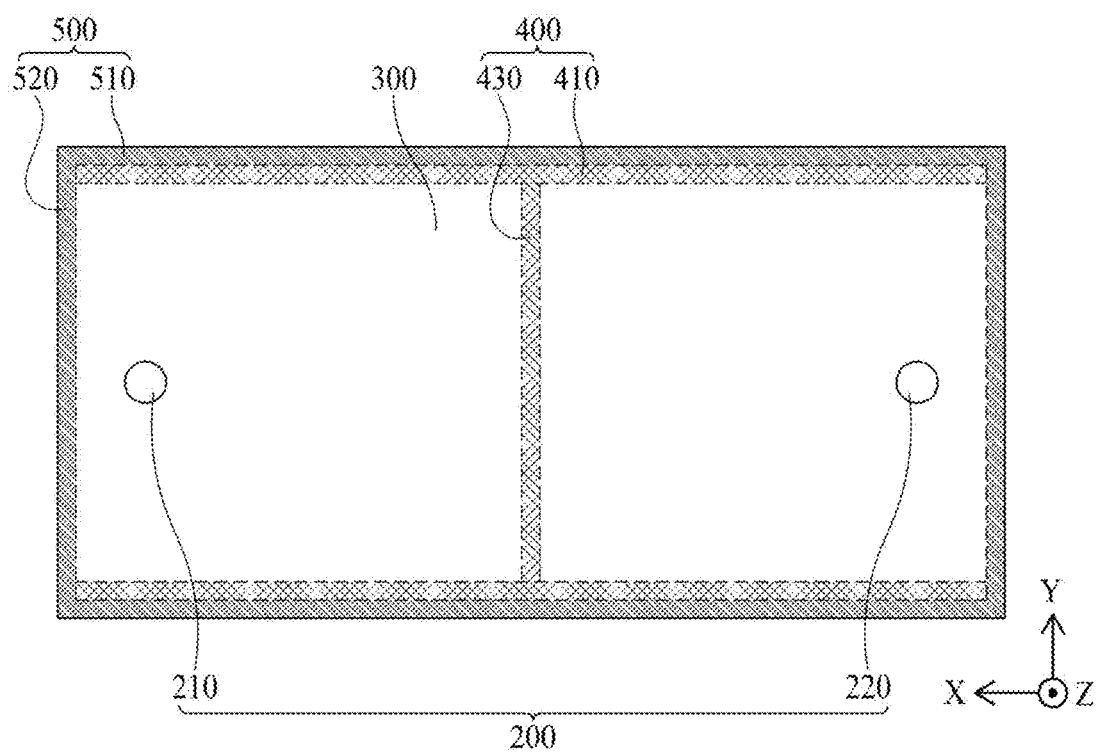
FIG. 7 is a rear view of a display apparatus according to a third embodiment of the present disclosure.
Figure 8:
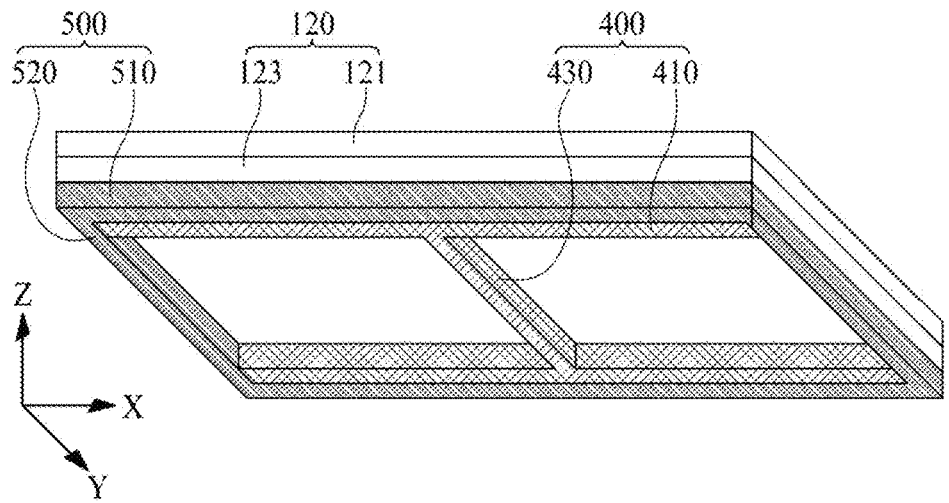
FIG. 8 is a perspective view illustrating a configuration of a stiff member in the display apparatus of FIG. 7.

FIG. 7 is a rear view of a display apparatus according to a third embodiment of the present disclosure, and FIG. 8 is a perspective view illustrating a configuration of a stiff member in the display apparatus of FIG. 7.

Referring to FIGS. 7 and 8, a stiff member 400 may include a first stiff member 410 and a third stiff member 430. In detail, the display module 100 may include a pair of first edges parallel to a first direction X and a pair of second edges parallel to a second direction Y intersecting the first direction X. Here, the pair of first edges of the display module 100 may correspond to an edge parallel to a long side of the display module 100, and the pair of second edges may correspond to an edge parallel to a short side of the display module 100. However, the present embodiment is not limited thereto. Also, the first stiff member 410 may be disposed in parallel with the pair of first edges of the display module 100, and the third stiff member 430 may be disposed in parallel with the pair of second edges of the display module 100 to overlap a center of the display module 100.

For example, the first stiff member 410 may be disposed on the rear surface of the backlight unit 120 along the long side lengthwise direction X of the backlight unit 120, and the third stiff member 430 may be disposed along the short side lengthwise direction Y of the backlight unit 120 to pass through a center of the rear surface of the backlight unit 120. In other words, the stiff member 400 may be provided in an H-shape on the rear surface of the backlight unit 120. Therefore, since each of the first and third stiff members 410 and 430 is disposed along the long side lengthwise direction X or the short side lengthwise direction Y of the backlight unit 120, the stiffness of the display module 100 is complemented, thereby improving the electromagnetic force performance of the vibration generating device 200.

According to an embodiment, the stiff member 400 may be disposed in parallel with the adhesive member 500. In detail, the stiff member 400 may include the first stiff member 410 and the third stiff member 430. The first stiff member 410 may be disposed in parallel with a pair of first edges of the display module 100, and the third stiff member 430 may be disposed in parallel with a second direction Y to overlap the center of the display module 100. For example, the first stiff member 410 may be disposed in a pair of long side edges of the display module 100, and the third stiff member 430 may be spaced apart from a pair of short side edges of the display module 100 and may cross the center of the display module 100. However, the present embodiment is not limited thereto. Also, the adhesive member 500 may include a first adhesive member 510 disposed in the pair of first edges of the display module 100 and a second adhesive member 520 disposed in a pair of second edges of the display module 100. Therefore, the first stiff member 410 may be disposed on the rear surface of the display module 100 in parallel with the first adhesive member 510, and the third stiff member 430 may be disposed on the rear surface of the display module 100 and may be spaced apart from the second adhesive member 520. In other words, the stiff member 400 may be provided in an H-shape on the rear surface of the backlight unit 120. For example, both ends of the first stiff member 410 may contact the second adhesive member 520 disposed in the pair of second edges, and both ends of the third stiff member 430 may contact a center of the first adhesive member 510. As another example, the both ends of the first stiff member 410 may be spaced apart from the second adhesive member 520 disposed in the pair of second edges, and the both ends of the third stiff member 430 may be spaced apart from a center of the first adhesive member 510. Also, the first stiff member 410 may contact an inner surface of the first adhesive member 510, but is not limited thereto. As a result, the first stiff member 410 and the first adhesive member 510 may be disposed in parallel along the long side lengthwise direction X of the backlight unit 120, and the third stiff member 430 and the second adhesive member 520 may be disposed in parallel along the short side lengthwise direction Y of the backlight unit 120 and may be spaced apart from each other, thereby more complementing the stiffness of the display module 100 than a weight increase rate of the display module 100 to improve the electromagnetic force performance of the vibration generating device 200.

Figure 9:
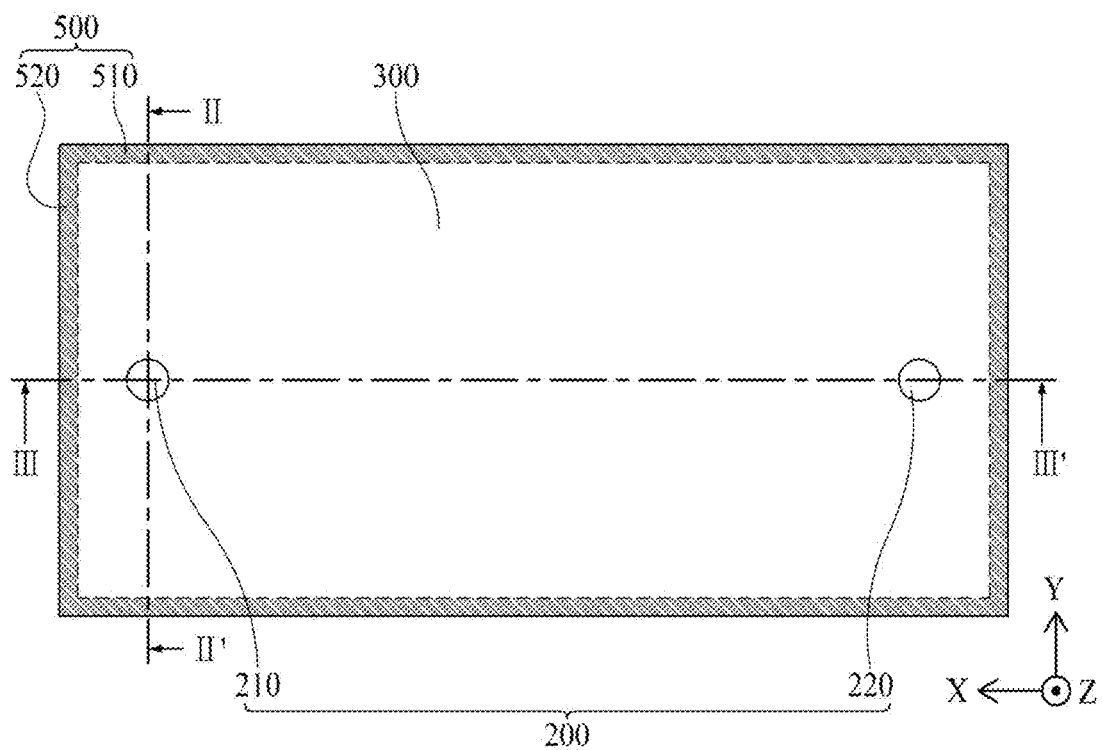
FIG. 9 is a rear view of a display apparatus according to a fourth embodiment of the present disclosure.
Figure 10:
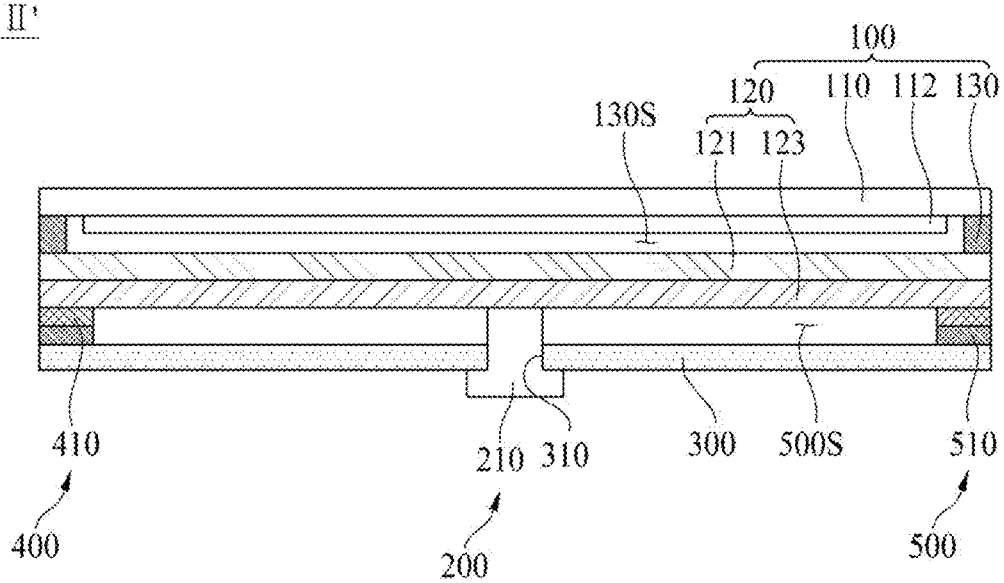
FIG. 10 is a cross-sectional view taken along line II-II' of FIG. 9.

FIG. 9 is a rear view of a display apparatus according to a fourth embodiment of the present disclosure, and FIG. 10 is a cross-sectional view taken along line II-IF of FIG. 9.

Referring to FIGS. 9 and 10, a display module 100 may include a pair of first edges parallel to a first direction X and a pair of second edges parallel to a second direction Y intersecting the first direction X. Here, the pair of first edges of the display module 100 may correspond to an edge parallel to a long side of the display module 100, and the pair of second edges may correspond to an edge parallel to a short side of the display module 100. However, the present embodiment is not limited thereto. Also, an adhesive member 500 may include a first adhesive member 510 disposed in the pair of first edges of the display module 100 and a second adhesive member 520 disposed in the pair of second edges of the display module 100.

A stiff member 400 may include a first stiff member 410 disposed between the display module 100 and the first adhesive member 510. For example, the first stiff member 410 may be provided between a rear surface of a backlight unit 120 and a front surface of the first adhesive member 510 and may be disposed along a long side lengthwise direction X of the backlight unit 120. Accordingly, since the first stiff member 410 is disposed along the long side lengthwise direction X of the backlight unit 120, the stiffness of the display module 100 is complemented, thereby improving the electromagnetic force performance of a vibration generating device 200.

Figure 11A:
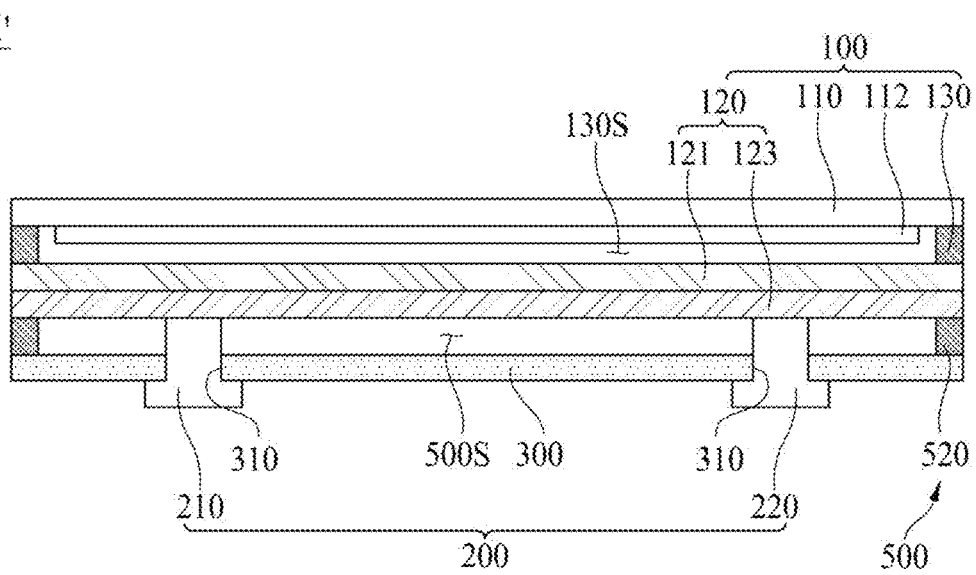
FIGS. 11A and 11B are cross-sectional views taken along line of FIG. 9.
Figure 11B:
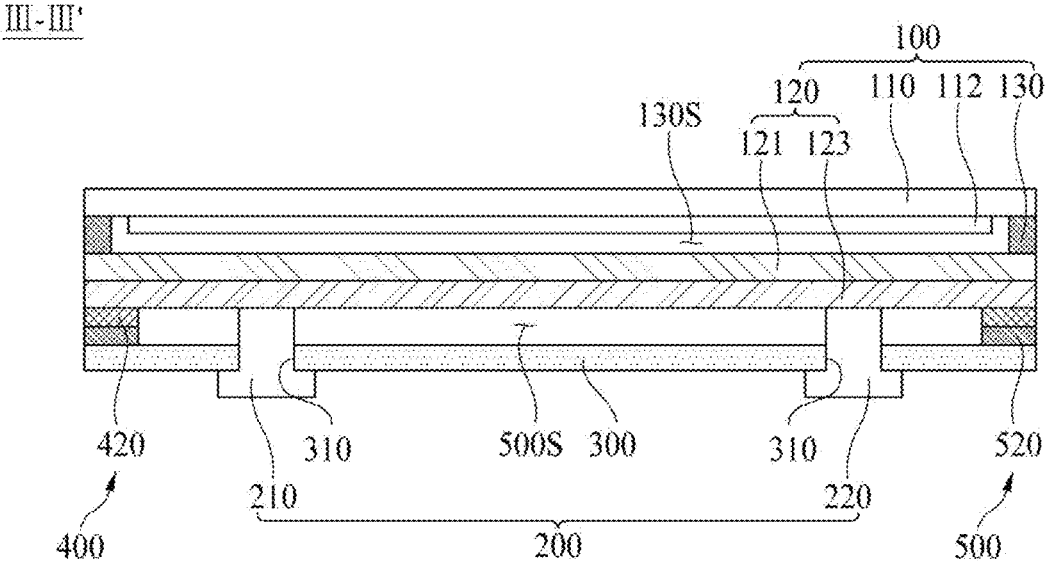
Figure 12A:
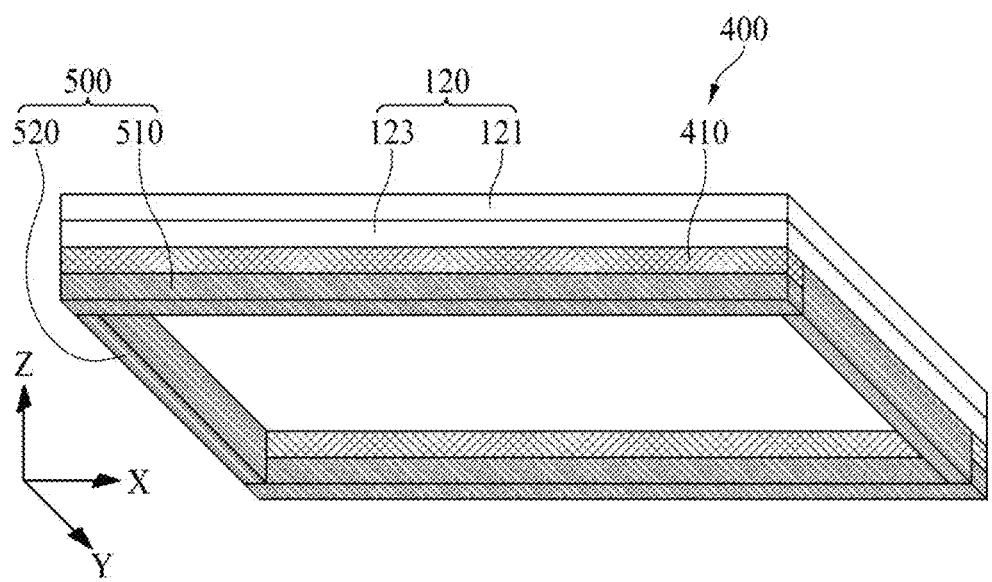
FIGS. 12A and 12B are perspective views illustrating a configuration of a stiff member in the display apparatus of FIG. 9.
Figure 12B:
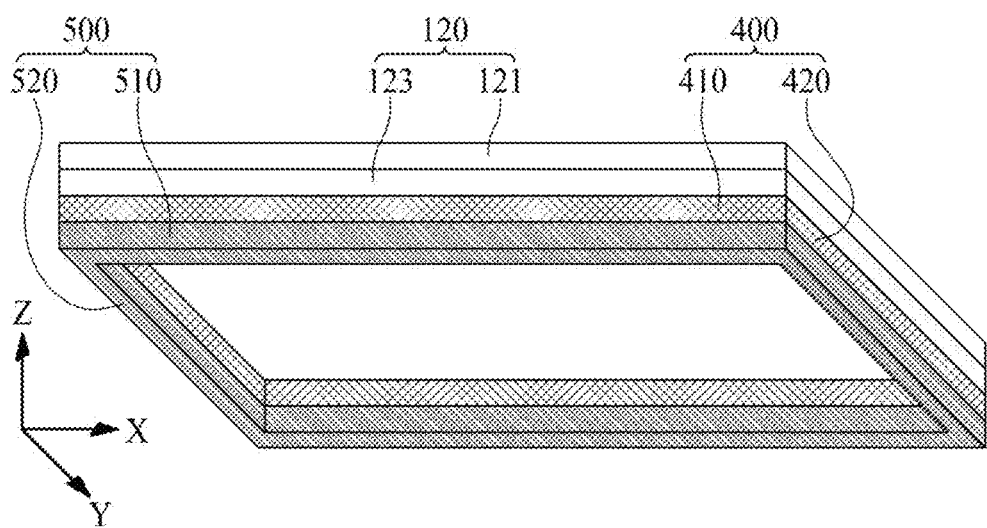

FIGS. 11A and 11B are cross-sectional views taken along line III-III' of FIG. 9, and FIGS. 12A and 12B are perspective views illustrating a configuration of a stiff member in the display apparatus of FIG. 9.

Referring to FIGS. 11A and 12A, an adhesive member 500 may include a first adhesive member 510 disposed in a pair of first edges of a display module 100 and a second adhesive member 520 disposed in a pair of second edges of the display module 100. Here, a first stiff member 410 and the first adhesive member 510 may be disposed in a pair of first edges between the display module 100 and a rear structure 300 to overlap each other, and only the second adhesive member 520 may be disposed in a pair of second edges between the display module 100 and the rear structure 300. Therefore, a height of a gap space 500S between a rear surface of a backlight unit 120 and a front surface of the rear structure 300 may be equal to a sum of a height of the first stiff member 410 and a height of the first adhesive member 510 and may be equal to a height of the second adhesive member 520. In other words, the height of the second adhesive member 520 may correspond to the sum of the height of the first stiff member 410 and the height of the first adhesive member 510. Also, the first stiff member 410 may be disposed to overlap the first adhesive member 510, and thus, may be disposed in an outermost edge of the display module 100. For example, if the first stiff member 410 is disposed to overlap the first adhesive member 510, the first stiff member 410 may be disposed more outward from the display module 100 than a case where the first stiff member 410 is disposed in parallel with the first adhesive member 510. As a result, since the first stiff member 410 is disposed to overlap the first adhesive member 510, the stiffness of the display module 100 is more complemented than a case where the first stiff member 410 is disposed in parallel with the first adhesive member 510, thereby outputting a sound having a high sound pressure level corresponding to the high frequency domain. Also, the second adhesive member 520 may be disposed on both side surfaces of the gap space 500S between the rear surface of the backlight unit 120 and the front surface of the rear structure 300, thereby preventing light from being leaked to the outside of the display apparatus 10.

Referring to FIGS. 11B and 12B, a stiff member 400 may include the first stiff member 410 disposed in parallel with the pair of first edges of the display module 100 and a second stiff member 420 disposed in parallel with the pair of second edges of the display module 100. Also, the adhesive member 500 may include the first adhesive member 510 disposed in the pair of first edges of the display module 100 and the second adhesive member 520 disposed in the pair of second edges of the display module 100. Here, the first stiff member 410 and the first adhesive member 510 may be disposed in the pair of first edges between the display module 100 and the rear structure 300 to overlap each other, and the second stiff member 420 and the second adhesive member 520 may be disposed in the pair of second edges between the display module 100 and the rear structure 300 to overlap each other. Therefore, a height of the gap space 500S between the rear surface of the backlight unit 120 and the front surface of the rear structure 300 may be equal to the sum of the height of the first stiff member 410 and the height of the first adhesive member 510 and may be equal to a sum of a height of the second stiff member 420 and the height of the second adhesive member 520. In other words, the sum of the height of the first stiff member 410 and the height of the first adhesive member 510 may be equal to the sum of the height of the second stiff member 420 and the height of the second adhesive member 520. Also, the first and second stiff members 410 and 420 may be disposed to respectively overlap the first and second adhesive members 510 and 520, and thus, may be disposed in the outermost edge of the display module 100. For example, if the first stiff member 410 is disposed to overlap the first adhesive member 510, the first stiff member 410 may be disposed more outward from the display module 100 than a case where the first stiff member 410 is disposed in parallel with the first adhesive member 510. As a result, since the first and second stiff members 410 and 420 are disposed to respectively overlap the first and second adhesive members 510 and 520, the stiffness of the display module 100 is more complemented than a case where first and second stiff members 410 and 420 are respectively disposed in parallel with the first and second adhesive members 510 and 520, thereby outputting a sound having a high sound pressure level corresponding to the high frequency domain.

Figure 13A:
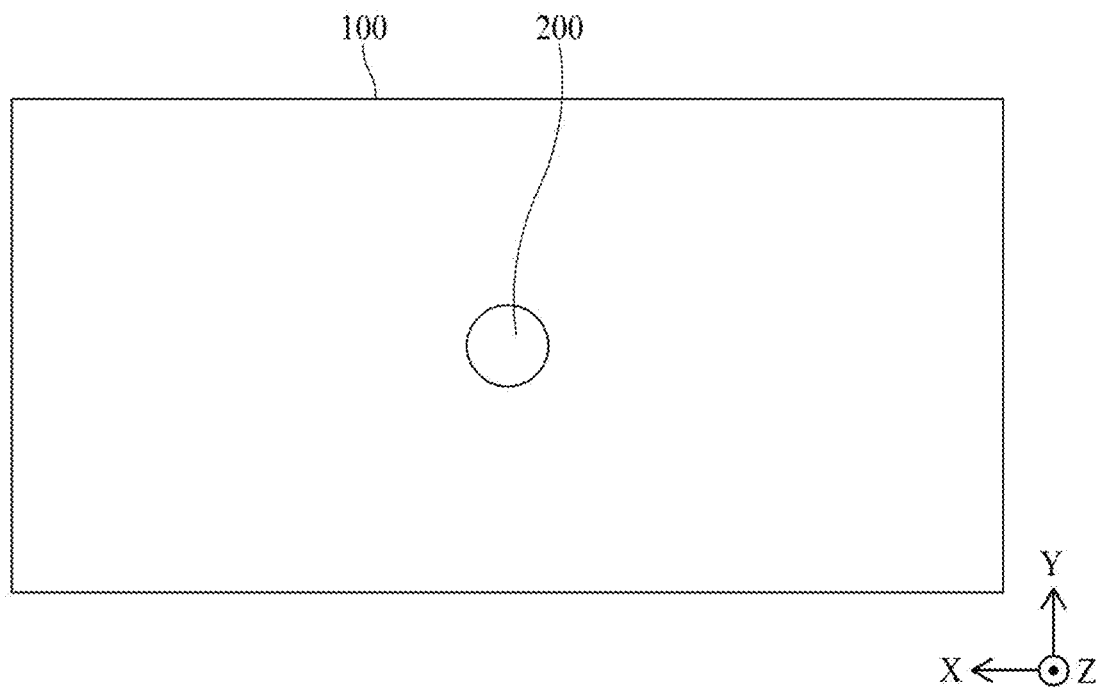
FIGS. 13A and 13B are diagrams illustrating a vibration displacement based on a stiffness of a display module in a display apparatus according to an embodiment of the present disclosure.
Figure 13A:
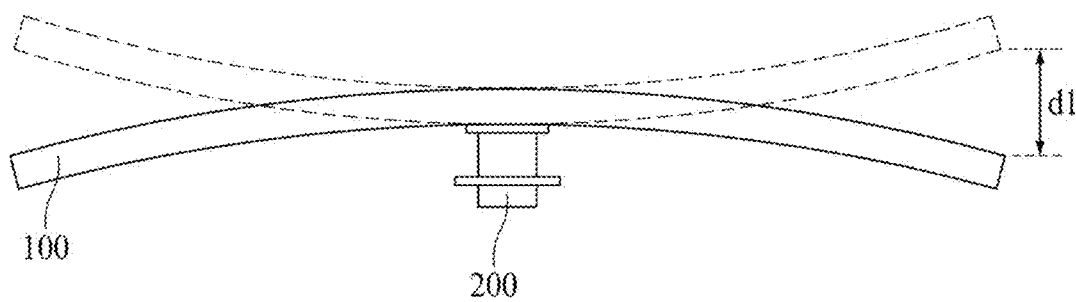
Figure 13B:
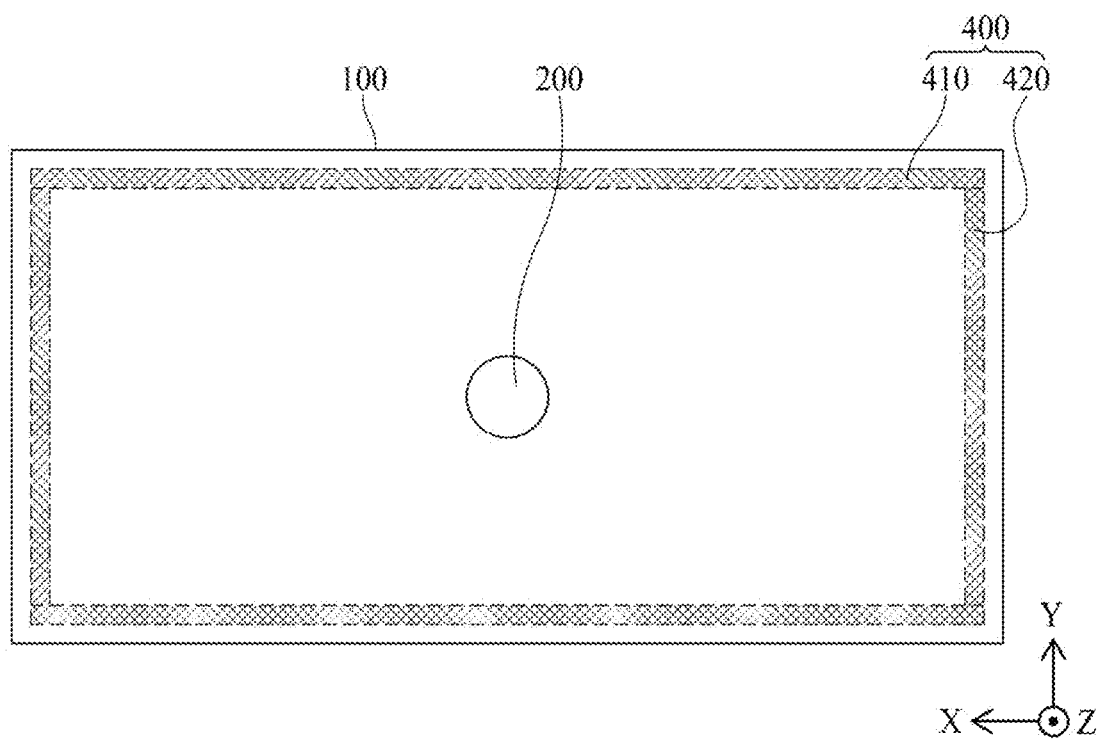
Figure 13B:
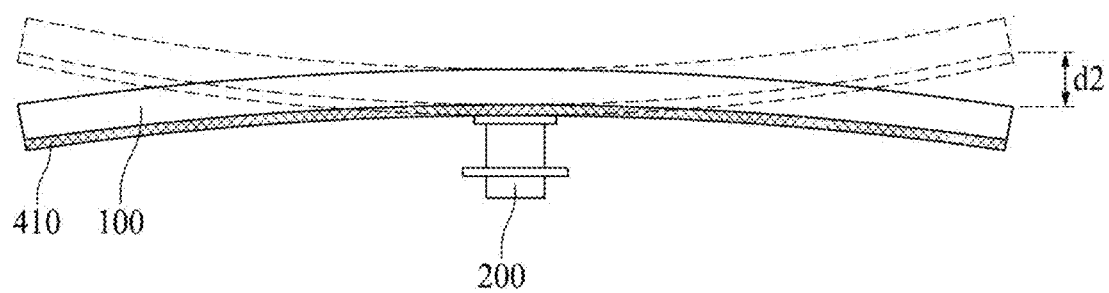

FIGS. 13A and 13B are diagrams illustrating a vibration displacement based on a stiffness of a display module in a display apparatus according to an embodiment of the present disclosure. In detail, FIG. 13A illustrates a rear view and a side view of a related art vibration generating device and display module including no stiff member, and FIG. 13B illustrates a rear view and a side view of a display module 100 and a vibration generating device 200 according to an embodiment of the present disclosure.

Referring to FIGS. 13A and 13B, in a display apparatus according to the present disclosure, a stiff member 400 may be disposed on a rear edge of the display module 100, and thus, enhances an electromagnetic force of the vibration generating device 200 in comparison with the related art display module including no stiff member, thereby preventing a sound pressure level corresponding to the high frequency domain from being reduced. In detail, the display module 100 according to the present disclosure may include first and second stiff members 410 and 420 disposed a rear surface thereof, and thus, may have stiffness which is stronger than that of the related art display module. Here, a resonant frequency "$f_0$" of a vibration generated by the vibration generating device 200 may be determined as expressed in the following equation:

$$f_0 = \frac{1}{2\pi}\sqrt{\frac{k}{m}}$$

where k denotes a stiffness of an object, m denotes a mass of the object. For example, if the first and second stiff members 410 and 420 are disposed in a pair of first and second edges of the display module 100, the mass "m" of the display module 100 acting as a vibration plate increases, and simultaneously, the stiffness "k" of the display module 100 increases more than an increase rate of the mass "m", thereby enhancing a vibration characteristic corresponding to the high frequency domain. Accordingly, in the display apparatus 10, since the stiff member 400 is disposed on the rear edge of the display module 100, an increase in the mass "m" of the display module 100 acting as a vibration plate is minimized, and the stiffness "k" of the display module 100 is complemented.

For example, a display module of a related art display apparatus is lower in stiffness than the display module of the display apparatus 10 according to the present disclosure, and thus, a vibration displacement d1 of the display module acting as a vibration plate increases, and the resonant frequency "$f_0$" of the display module decreases. Therefore, in the related art display apparatus, since the resonant frequency "$f_0$" of the display module is reduced, it is unable to prevent a sound pressure level corresponding to the high frequency domain from being reduced.

On the other hand, in the display apparatus 10 according to the present disclosure, the stiff member 400 may be provided in the rear edge of the display module 100, and thus, in comparison with the related art display apparatus, the stiffness of the display module 100 is reinforced, and a vibration displacement d2 of the display module acting as a vibration plate is reduced, thereby increasing the resonant frequency "$f_0$" of the display module. Therefore, in the display apparatus 10 according to the present disclosure, the resonant frequency "$f_0$" of the display module increases, thereby preventing a sound pressure level corresponding to the high frequency domain from being reduced. As a result, the display apparatus 10 according to the present disclosure enhances the electromagnetic force of the vibration generating device 200 acting on the display module 100, and thus, prevents a sound pressure level corresponding to the high frequency domain from being reduced, thereby enhancing flatness of a sound pressure level corresponding to a whole frequency domain and enhancing clarity of a sound.

Figure 14:
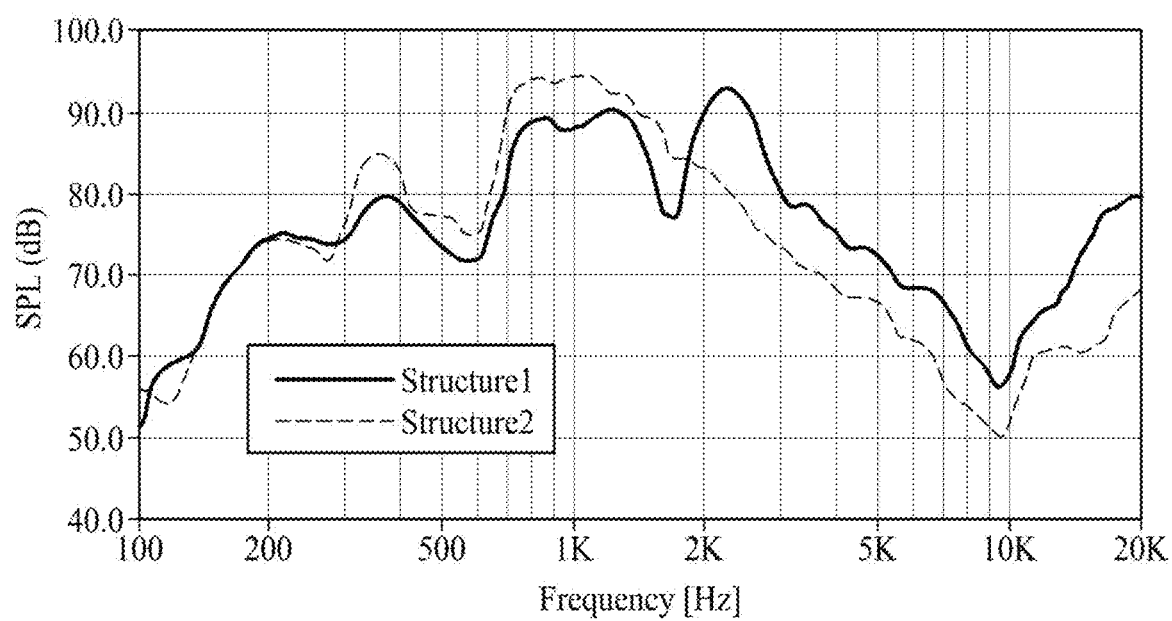
FIG. 14 is a diagram showing an increase in a sound pressure level corresponding to a high frequency domain in a display apparatus according to an embodiment of the present disclosure with respect to the related art.

FIG. 14 is a diagram showing an increase in a sound pressure level corresponding to a high frequency domain in a display apparatus according to an embodiment of the present disclosure with respect to the related art. In detail, a first structure (Structure 1) corresponds to the display apparatus 10 according to the first embodiment of the present disclosure, and a second structure (Structure 2) corresponds to the related art display apparatus which does not include a stiff member. Also, it is assumed that the first and second structures include the same elements, except for a stiff member.

Referring to FIG. 14, the related art display apparatus (Structure 2) shows the noticeable reduction in a sound pressure level SPL in a high frequency domain of 2 kHz or more. It can be seen that such a result is because a stiffness of a display module is low, and due to this, a vibration transfer characteristic is reduced, causing attenuation of a vibration having the high frequency domain. However, it can be seen that in the display apparatus (Structure 1) according to an embodiment of the present disclosure, the reduction in the sound pressure level SPL in the high frequency domain of 2 kHz or more is reduced in comparison with the related art display apparatus (Structure 2). It can be seen that such a result is because the stiff member 400 is attached on the rear edge of the display module 100, and thus, the stiffness of the display module 100 acting as a vibration plate increases, thereby enhancing a vibration transfer characteristic of the display module 100. Also, it can be seen that the result is because the stiff member 400 decreases the vibration displacement of the display module to minimize attenuation of a vibration having the high frequency domain.

Therefore, it can be seen that in the display apparatus (Structure 1) according to an embodiment of the present disclosure, flatness of the sound pressure level SPL corresponding to a whole frequency domain is more noticeably enhanced than the related art display apparatus (Structure 2). Accordingly, in the display apparatus (Structure 1) according to an embodiment of the present disclosure, the stiff member 400 enhances a transfer characteristic of a vibration generated by the sound generating device 200, thereby preventing a sound pressure level corresponding to the high frequency domain from being reduced and enhancing flatness of a sound pressure level corresponding to a whole frequency domain to enhance clarity of a sound.

As described above, according to the embodiments of the present disclosure, the display apparatus may output a sound to a region in front of the display panel. Accordingly, a position of an image displayed by the display apparatus may match a position of a sound generated by the display apparatus, thereby enhancing an immersiveness of a viewer who is watching the image displayed by the display apparatus.

Moreover, in the display apparatus according to the embodiments of the present disclosure, since the stiff member is disposed on the rear surface of the display module acting as a vibration plate, a stiffness of the display module is complemented, thereby improving the electromagnetic force performance of the vibration generating device.

Moreover, in the display apparatus according to the embodiments of the present disclosure, since the stiff member is disposed in the rear edge of the display module, an increase in mass of the display module acting as a vibration plate is minimized, and the stiffness of the display module is complemented, thereby improving the electromagnetic force performance of the vibration generating device to enhance the vibration transfer characteristic of the display apparatus.

Moreover, in the display apparatus according to the embodiments of the present disclosure, the stiffness of the display module is complemented by using the stiff member, and thus, the electromagnetic force performance of the vibration generating device is improved, thereby preventing a reduction in a sound pressure level corresponding to the high frequency domain to enhance the quality of a sound output to a region in front of the display module.

Moreover, since the display apparatus according to the embodiments of the present disclosure includes the stiff member arranged in the long side direction of the display module, a sound pressure level corresponding to the high frequency domain is prevented from being reduced, thereby enhancing flatness of a sound pressure level corresponding to a whole frequency domain and enhancing clarity of a sound.

Moreover, the display apparatus according to the embodiments of the present disclosure prevents a sound pressure level corresponding to the high frequency domain from being reduced, thereby minimizing the loss of consumption power.

It will be apparent to those skilled in the art that various modifications and variations can be made in display device of the present disclosure without departing from the technical idea or scope of the disclosure. Thus, it is intended that the present disclosure covers the modifications and variations of this disclosure provided they come within the scope of the appended claims and their equivalents.

What is claimed is:

1. A display apparatus, comprising:
    a display module configured to display an image;
    a rear structure on the display module;
    a vibration generating device configured to vibrate the display module; and
    a stiff member disposed on a rear surface of the display module;
    wherein the stiff member is disposed on a rear surface of a backlight unit in a long-side lengthwise direction of the backlight unit, thereby improving an electromagnetic force performance of the vibration generating device.

2. The display apparatus of claim 1, wherein the stiff member overlaps at least one edge of the display module.

3. The display apparatus of claim 2, further comprising an adhesive member disposed between the display module and the rear structure to attach the display module on the rear structure.

4. The display apparatus of claim 3, wherein
    the display module comprises:
    a pair of first edges parallel to a first direction; and
    a pair of second edges parallel to a second direction, and
    the adhesive member comprises:
    a first adhesive member disposed in the pair of first edges; and
    a second adhesive member disposed in the pair of second edges.

5. The display apparatus of claim 4, wherein the stiff member comprises a first stiff member disposed on the rear surface of the display module in parallel with the first adhesive member.

6. The display apparatus of claim 5, wherein the stiff member further comprises a second stiff member disposed on the rear surface of the display module in parallel with the second adhesive member.

7. The display apparatus of claim 5, wherein the stiff member further comprises a third stiff member disposed in parallel with the second direction to overlap a center of the display module.

8. The display apparatus of claim 4, wherein the stiff member comprises a first stiff member disposed between the display module and the first adhesive member.

9. The display apparatus of claim 8, wherein the stiff member comprises a second stiff member disposed between the display module and the second adhesive member.

10. The display apparatus of claim 1, wherein the stiff member comprises aluminum (Al), copper (Cu), or stainless steel, or a tempered plastic compound, which is high in stiffness.

11. The display apparatus of claim 3, wherein the stiff member is higher in stiffness than the adhesive member.

12. The display apparatus of claim 1, wherein the stiff member contacts a front surface of the rear structure.

13. The display apparatus of claim 1, wherein the stiff member is spaced apart from a front surface of the rear structure.

14. The display apparatus of claim 1, wherein
    the display module comprises a left region, a right region, and a middle region, and
    the vibration generating device comprises:
    a first sound generating module overlapping the left region;

a second sound generating module overlapping the right region; and a third sound generating module overlapping the middle region.

15. The display apparatus of claim 14, wherein the first and second sound generating modules transfer a vibration having a high frequency domain to a left edge and a right edge of the display module, and the third sound generating module transfers a vibration having a low frequency domain to the middle region of the display module.

16. The display apparatus of claim 1, wherein the display module comprises:

a display panel; and a backlight unit disposed on the rear surface of the display panel.

17. The display apparatus of claim 16, wherein the display module further comprises a module adhesive member disposed between an edge of the display panel and an edge of the backlight unit.

* * * * *